United States Patent
Gunsser et al.

[15] 3,659,907
[45] May 2, 1972

[54] ARRANGEMENT FOR DETECTING SLIPPAGE OF WHEELS OF VEHICLES

[72] Inventors: Peter Gunsser; Richard Zechnall, both of Stuttgart

[73] Assignees: Klaus Christ, Stuttgart-Durrlewand, all of, Germany; Robert Bosch GmbH, Stuttgart, Germany

[22] Filed: Dec. 4, 1969

[21] Appl. No.: 882,101

[30] Foreign Application Priority Data

Dec. 9, 1968 Germany..................P 18 13 509.6

[52] U.S. Cl.................303/21 CF, 180/105 E, 303/20, 317/5, 318/52, 324/161, 340/263
[51] Int. Cl............................................................B60t 8/08
[58] Field of Search............188/181; 303/21, 20; 324/70 A, 324/70 C–70 G, 160, 161; 317/5; 307/254; 180/105 E; 340/52 R, 263; 318/52

[56] References Cited

UNITED STATES PATENTS

| | | |
|---|---|---|
| 3,563,611 | 2/1971 | Sharp..................303/21 CF |
| 3,184,606 | 5/1965 | Ovenden et al..................317/5 |
| 3,026,148 | 3/1962 | Ruof..................303/21 CF |
| 3,494,671 | 2/1970 | Slavin et al...................303/21 P |
| 3,511,542 | 5/1970 | Fielek, Jr..................303/21 CG |

Primary Examiner—Milton Buchler
Assistant Examiner—Stephen G. Kunin
Attorney—Michael S. Striker

[57] ABSTRACT

A slippage detecting system for use in conjunction with motor vehicles. Each wheel of the vehicle is provided with a transducer which supplies a voltage dependent upon the speed of the wheel. The transducer output is applied to a Schmitt-trigger circuit which becomes actuated when the voltage exceeds a predetermined value. Upon actuation of the Schmitt-trigger circuit, the braking system of the motor vehicle is operated through an amplifier, so that the braking force is regulated to prevent locking of the wheels. The transducer is in the form of a voltage generator with regulated excitation voltage. The voltage regulator includes an integrator and is connected between the output of the generator and the excitation winding thereof.

7 Claims, 6 Drawing Figures

Patented May 2, 1972

INVENTORS
Peter GUNSSER
Richard ZECHNALL
Klaus CHRIST

BY their ATTORNEY

Patented May 2, 1972

INVENTORS
Peter GUNSSER
Richard ZECHNALL
Klaus CHRIST
BY their ATTORNEY

ARRANGEMENT FOR DETECTING SLIPPAGE OF WHEELS OF VEHICLES

BACKGROUND OF THE INVENTION

The present invention resides in an arrangement detecting the danger of slippage of wheels in motor vehicles. A transducer is provided for each wheel, and transmits a characteristic signal which is dependent upon the rotational of the wheel or the surface velocity thereof. A signal processing stage, furthermore, is provided for establishing without delay any substantial slip of the vehicle wheels.

When braking a wheel while driving the vehicle, care is required not to lock the wheels, since they will then slide along the driving path. The coefficient of friction between a sliding wheel and the driving path is considerably lower than the coefficient of friction between a rolling wheel and the driving path. The wheels must also be prevented from locking from the viewpoint of driving safety, since the vehicle can easily skid during such condition. A wheel always becomes locked when the force directed along the drive path and applied to the wheel through the pressure between the brake shoes and the brake drum, becomes larger than the component directed perpendicular to the wheel axle arising from the coefficient of friction between the wheel and the driving path. This component is, furthermore, proportional to the loading of the wheel for realizing the maximum possible static frictional force.

When braking a vehicle on a straight path, the rear wheels become freed from load whereas the front wheels have load applied to them, during the braking or deceleration of the vehicle. In order to avoid the condition that the rear wheels become locked, the braking force applied to these wheels must be comparably reduced to the braking force applied to the front wheels. For purposes of increasing the safety conditions when turning or going around a curve while braking, the individual wheels must be differently braked while such braking action is in progress. In particular, the wheels prevailing at the outer side of the curve must be braked more severely than the wheels lying along the inner side of the curve.

The problems prevailing during the braking of a motor vehicle, also appear when the vehicle is accelerated. Thus, when accelerating the driving wheels of motor vehicles, it is possible that the latter may skid. At the same time, considerable time losses may be incurred with rail cars during the accelerating phase when the driving wheels are rotated. Braking regulating systems for preventing and regulating slippages are known in the art. In these conventional systems, the braking of the wheels is made automatically dependent upon the deceleration of the wheels when excessive. Such a deceleration of the rotational speed of the wheels indicates the beginning of a slippage phase. Electrical transducers are also known in the art which include a contact for providing electrical pulses and which becomes actuated through the relative motion between a swinging mass and the driving shaft of the wheels, when the acceleration is excessive.

All of these conventional arrangements known in the art, have the disadvantage that the transducers which provide signals for excessive deceleration or acceleration do not operate so that they are free from wear. Furthermore, these arrangements have the disadvantage that they are not provided with a reliable time constant to the extent that they will function without delay at the beginning of a sliding motion when braking or accelerating.

Accordingly, it is an object of the present invention to provide an arrangement which detects the danger of slippage of the wheels of motor vehicles, so that operation of the detection system takes place without wear and without substantial delay.

In accordance with the present invention, the object is achieved by constructing the transducer in the form of a generator with regulated voltage. The unregulated voltage of the generator is made dependent upon the surface speed or velocity of the wheels. The signal processing stage connected to the generator output is provided with logical switching elements, and becomes influenced through variations in the output voltage of the generator. Such influence on the signal processing unit takes place when the surface speed of the wheels exceeds a predetermined level.

A particularly good arrangement is realized when, in accordance with a further design of the present invention, the signal processing stage includes a Schmitt-trigger circuit with input connected to the output of the generator so that the Schmitt-trigger circuit is influenced by the voltage thereof. A voltage regulator with integral control, furthermore, is associated with the generator, and the input of the signal processing stage is directly connected to the output of the generator.

SUMMARY OF THE INVENTION

An arrangement for preventing skidding or slippage of motor vehicles. Each wheel of the vehicle is provided with a transducer in the form of a voltage generator which transmits a voltage dependent upon the speed of the wheel. The output of the voltage generator is applied to a Schmitt-trigger circuit which, in turn, emits a signal when the applied voltage exceeds a predetermined value. Through the application of an amplifier, the Schmitt-trigger circuit operates a braking system which in turn applies a braking force to the braking drum of the vehicle, so that locking of the wheels is prevented, and thereby possible skidding and sliding of the vehicle are also prevented. A voltage regulator connected to the output of the generator also regulates the voltage thereof in conjunction with an integral control circuit. At the same time, the generator output is connected directly to the Schmitt-trigger circuit. The voltage regulator is used to regulate the excitation current for the generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
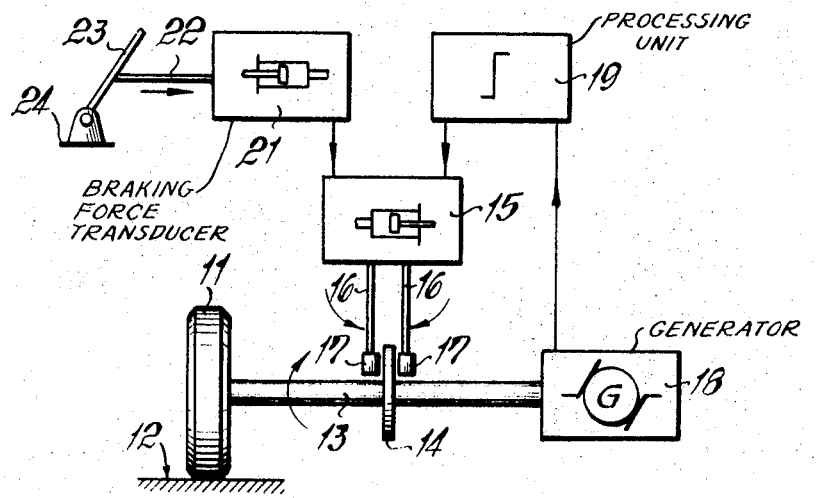
FIG. 1 is a block diagram of the arrangement for detecting slippage of a motor vehicle, in accordance with the present invention.

Referring to the drawing, FIG. 1 shows a wheel 11 of a motor vehicle which rolls upon the upper surface of a drive path 12. The wheel 11 is coupled with the axle 13 upon which a braking disc 14 is arranged. A braking cylinder arrangement 15 is operatively linked in the conventional manner to the brake disc 14, by way of linkage 16 on which the brake shoes 17 are arranged. The vehicle axle 13 is coupled to the mechanical input of a generator 18, whereas a processing unit or evaluating circuit 19 is connected to the electrical output of the generator 18. The output of the processing or evaluating circuit 19 is connected to a first input of the brake cylinder arrangement 15. The second input from this brake cylinder arrangement 15, is derived from the output of a braking force transducer 21. This braking force transducer 21 includes, for example, a hydraulic pressure cylinder, in which case the interconnecting line between the transducer 21 and the braking cylinder arrangement 15 is preferably constructed in the form of a tube or hose for conducting the fluid under pressure. The braking force transducer 21, furthermore, is linked to the brake pedal 23 through linkage 22. The brake pedal 23 is movably arranged or pivotally mounted on the vehicle chassis 24.

When the driver wishes to brake the motor vehicle equipped with the braking arrangement shown in FIG. 1, he depresses the brake pedal 23. The braking force applied to the pedal, becomes transmitted to the vehicle wheels, through the linkage 22 and the braking force transducer 21. In particular, a braking force is applied to the braking disc 14, through the brake cylinder arrangement 15, the linkage 16 and the brake shoes 17. With the braking force applied to the disc 14 in this manner, the axle 13 of the wheel 11 is decelerated. If the braking action is too severe, the motor vehicle wheel 11 may become entirely blocked or stopped, so that it no longer rolls upon the surface or path 12, but instead slides therealong. Such sliding of the wheel has the accompanying disadvantages enumerated above.

The generator 18 coupled to the vehicle axle 13 produces an output voltage, the unregulated value of which is dependent upon the surface velocity of the wheel 11. Through means of an associated voltage regulator, this output voltage from the generator is maintained substantially constant during normal accelerating and decelerating intervals. The processing circuit 19 is made dependent upon the magnitude of the output voltage from the generator 18. When this output voltage from the generator drops below a predetermined level, the unit 19 transmits to the brake cylinder arrangement 15, a signal which results in a reduction of the braking force applied by the shoes 17 to the disc 14. When the vehicle speed decreases and the surface velocity or speed of the wheel 11 thereby decreases correspondingly, the output voltage from the generator also decreases. For this reason, however, the voltage regulator is provided which maintains the generator voltage output substantially constant for relatively small variations in the surface velocity of the vehicle wheel 11.

Figure 2:
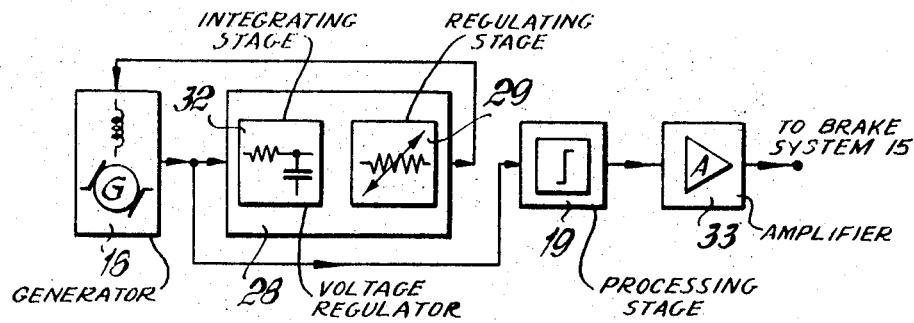
FIG. 2 is a block diagram of the circuit details for a voltage generator used in conjunction with the arrangement of FIG. 1.

In the block diagram of FIG. 2, the output of the generator 18 is shown to be connected with the input of the processing stage 19 which contains a Schmitt-trigger circuit. The output of the signal generator 18 is, furthermore, connected to the input of a voltage regulator 28 which contains a regulating stage 29. The latter, in turn, influences the excitation current of the generator 18. The voltage regulator 28, furthermore, includes an integrating stage 32 which is connected to the input of the regulating stage 29. The output of the processing stage 19, furthermore, is connected to the input of an amplifier 33.

Figure 3:
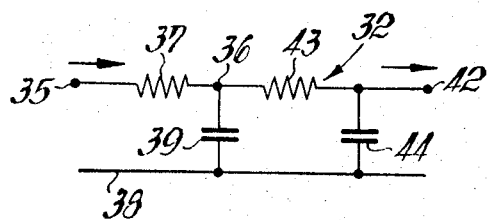
FIG. 3 is an electrical circuit diagram and shows the integrating stage used in conjunction with the regulation of the voltage of the generator in FIG. 2.

FIG. 3 shows the details of the integrating stage 32. A first resistor 37 is connected between the input terminal 35 of the integrating stage, and a circuit junction 36. A first capacitor 39, furthermore, is connected between this circuit junction 36 and a common return line 38. A second resistor 43 is connected between the output terminal 42 of the integrating stage, and this same circuit junction 36. A second capacitor 44 is arranged between this output terminal 42 and the common return line 38. FIG. 3 illustrates only a simple embodiment in which the integrating stage may be designed or constructed. Other well-known arrangements may, of course, also be applied for this use or purpose, and this circuit may, for example, be in the form of a semi-conductor Miller integrator.

Figure 4:
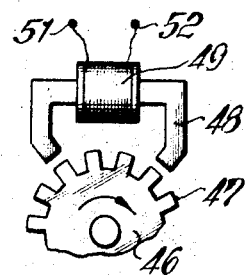
FIG. 4 is a functional diagram and shows the construction of the voltage generator used in conjunction with the arrangement of FIG. 1.

FIG. 4 shows an embodiment of an arrangement for regulating the braking force applied, in accordance with the present invention, through the use of a generator. A transducer wheel 46, for example, is mechanically coupled to the axle 13 of the motor vehicle, and is made of ferromagnetic material. This transducer wheel 46 carries projections in the form of teeth 47, for example, along its periphery. A core or yoke 48 extends across the transducer wheel and is horseshoe shaped or U-shaped. The poles of the core lie across either a tooth 47 of the wheel 46, or a space between teeth. A constant D.C. current flows through the coil 49. Depending upon the position of the transducer wheel 46, the inductance of the coil 49 varies. Thus, the inductance will vary depending upon whether the magnetic circuit is closed through the wheel 46, the core 48, and the teeth 47, or whether this magnetic circuit is opened by being directed through the gaps or spaces between the teeth.

If the transducer wheel 46 rotates with respect to the core or yoke 48, the inductance of the coil 49 oscillates periodically, and an alternating current becomes superimposed onto the direct current flowing through the coil 49. The alternating voltage components resulting from the current oscillations become capacitatively filtered out across the terminals 51 and 52 of the coil 49. A different design is also possible. Thus, the transducer wheel 46 carries a number of magnets 47 about its periphery, and these magnets are arranged with alternating polarity. The magnet 47 can be mounted individually upon the wheel through a mechanically adapted material. At the same time, the wheel 47 may consist, on the other hand, of permanent magnetic material, and the magnets at the periphery of the wheel where magnetically applied in the fabrication of the wheel. A core 48 extends, again, across the wheel 47, so that one pole of the core lies opposite a magnet of one polarity, and the second pole of the core lies across a magnet of opposite polarity. An air gap prevails between the poles of the core 48 and the magnets. A coil 49 is arranged upon the core 48. When, now, the transducer wheel 46 rotates relative to the core 48, positive and negative pulses are realized at the output terminal 51 and 52 of the coil 49. With increase in the rotational speed of the transducer wheel 46, the frequency of these pulses increases correspondingly.

The arrangement in accordance with the present invention, will now be described in conjunction with the block diagram of FIG. 2. The generator 18 which may be designed, for example, in the form of a D.C. generator with separate excitation, generates a voltage which is proportional to the rotational speed of the generator shaft when rotating in a constant magnetic field due to the excitation winding. The output voltage from the generator is applied to the input of voltage regulator 28 which compares this generated voltage with a predetermined desired voltage value. As soon as the output voltage of the generator 18 rises, the regulating stage 29 reduces the current through the excitation winding of the generator 18, and as a result the output voltage from this generator again decreases. In order to avoid oscillations, an integrating stage 32 is connected in front of the regulating stage 29. When the rotational speed varies rapidly, the output voltage of the generator 18 cannot be immediately regulating or contemplated, since the magnetic field of the excitation coil cannot vary in a stepwise manner. The regulating stage 29 is, furthermore, associated with a predetermined time constant. Consequently, in view of the integrating stage 32 connected in front of the regulating stage 29, a deviation of difference exists between the generator output voltage and the desired voltage during rapid variations of the rotational speed.

Figure 5:
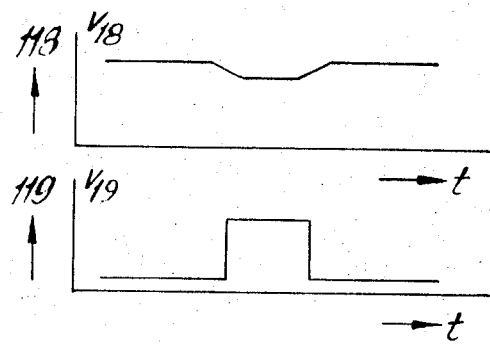
FIG. 5 is a graphical representation of voltage signals prevailing in the circuitry of FIG. 2.

The input of the processing stage 19 is directly connected with the output of the generator 18. As already indicated, the stage 19 is equipped with a Schmitt-trigger circuit. When the rotational speed variations of the vehicle wheel 11 lie within permissible limits established for normal braking or normal acceleration, the Schmitt-trigger circuit within the unit 19 assumes a stable state in which it transmits no signal to the amplifier 33. If the rotational speed of the vehicle wheel 11 changes from a previous quantity as in the case of the transition from static friction to kinetic friction, the voltage regulator 28 does not tend to compensate the output voltage from the generator 18 with sufficient rapidity. Accordingly, the output voltage drops below the predetermined level at the Schmitt-trigger circuit within the unit 19, and as a result the latter is actuated and transmits a pulse. This process is shown in FIG. 5, in which the curve 118 shows the output voltage of the generator 18, and the curve 119 represents the output voltage of the Schmitt-trigger circuit 19. Both of these curves are illustrated as a function of time *t*. Direct actuation of the braking system 15 is then realized through the amplifier 33 and a following electromechanical converting unit.

Figure 6:
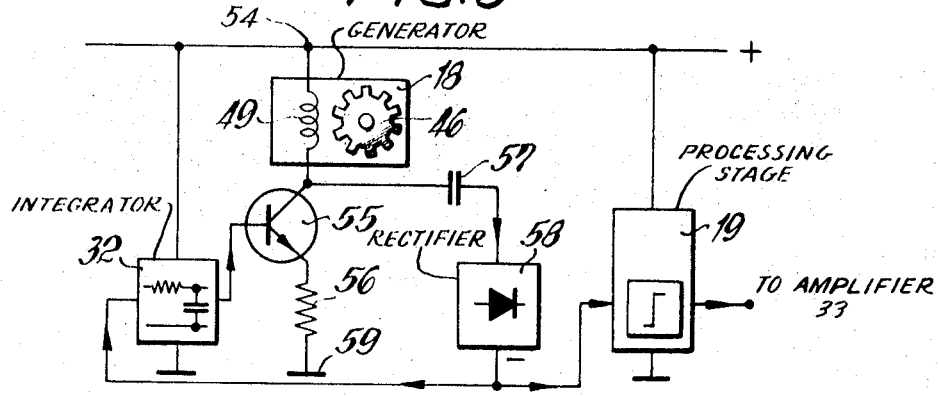
FIG. 6 is a schematic diagram of an arrangement using the voltage generator of FIG. 4 when operating in conjunction with the arrangement of FIG. 1.

The circuit arrangement of FIG. 2 is designed so that small variations in the output voltage 118 are of no consequence since they do not produce actuation or switching of the Schmitt-trigger circuit within the unit 19. Accordingly, a measure of safety is realized from the viewpoint of fabricating tolerances. In the schematic circuit diagram of FIG. 6, one end or terminal of the excitation winding 49 of the generator 18, is connected to the positive terminal of a current source, not shown. The other end or terminal of the excitation winding 49, on the other hand, is connected to the collector of a transistor 55. A stabilizing resistor 56 is connected between the emitter of the transistor 55 and the negative terminal of that current source, not shown. A capacitor 57 is connected, furthermore, to the collector of the transistor 55 and the input of a rectifier 58. The output of this rectifier is connected to both the input of the Schmitt-trigger circuit within the unit 19, and the input of the integrator 32. The output of this integrating circuit 32 is connected to the base of a transistor 55.

When the vehicle is stationary, current flows from the positive terminal 54 to the negative terminal 59, through the path of the excitation winding 49, the transistor 55, and the resistor 56. When the transducer wheel 46 rotates with substantially constant speed, the inductance of the excitation winding 49 varies or oscillates synchronously. As a result, the current flowing through the excitation winding 49 is also subjected to oscillations. The alternating voltage components which arise therefrom, can be filtered out at the terminals of the excitation winding 49. The alternating voltage components are applied to the rectifier 58, through the capacitor 57, and the rectifier thereby emits a pulsating D.C. voltage. The integrating stage 32 forms, thereby, the average value, and establishes the operating point of the transistor 55, thereby, from this average D.C. voltage. When the transducer wheel 46 turns more rapidly, the alternating voltage components across the capacitor 57 have also a higher or greater magnitude. This leads to a higher pulsating D.C. voltage at the negative output of the rectifier arrangement 58, and thereby to a more negative value or level at the output of the integrating stage 32. The operating point of the transistor 55 is thereby shifted so that a lower current flows through the excitation winding 49. As a result, the alternating voltage components appearing across the capacitor 57 are also made smaller. When the transducer wheel 46 rotates more slowly, the alternating voltage components drop in magnitude, and the pulsating D.C. voltage becomes thereby smaller. The operating point of the transistor 55 is finally displaced or shifted so that the current through the excitation winding 49 increases which, in turn, increases the alternating voltage components again.

As long as the transducer wheel 46 is decelerated by a substantially small amount, the entire regulating loop through the rectifier 58, integrating stage 32 and transistor 55, has sufficient time to maintain the variations of the alternating voltage components across the capacitor 57 sufficiently small. When the deceleration of the transducer wheel 46, however, exceeds a predetermined value, a sharp step variation appears in the D.C. voltage at the output of the rectifier 58. This resulting D.C. step voltage remains until the operating point of the transistor 55 is again shifted through the integrating stage 32. With such a severe voltage change, however, the voltage drops below the threshold level of the Schmitt-trigger circuit within the stage 19, and as a result the Schmitt-trigger circuit transmits a signal to the amplifier 33. This output signal then operates upon the brake system 15 of the motor vehicle, before the wheel 11 has become completely locked. Prior to the instant that the motor vehicle becomes absolutely stationary, the arrangement is rendered inoperative.

The arrangement in accordance with the present invention, has a number of further advantages. Thus, a transducer is used which is free from wear and which will be operational for the operating life of the arrangement, and will be thereby operating reliably during this period. The arrangement of the present invention, operates also practically without any delay times so that the system functions in the braking or driving mode when the vehicle first commences to slide. The digital regulating process, furthermore, has the advantage that the operation is carried out without being subjectable to the influences of noise effects. The response to stray pulses and oscillations appearing across the voltage supply line when using conventional accelerometers with conventional differentiating stages, is avoided through the present invention. The arrangement of the present invention also takes into account the conditions that an increase braking force is required to hold or lock the wheels when the weight of the vehicle increases through increased load, and the vehicle is braked. At the same time, the present arrangement also takes into account the condition that an increased operating or driving force is required to rotate the wheels when accelerating such a heavier vehicle. The same arrangement provides, therefore, for reducing the danger resulting from locking the wheels, and also reducing the danger resulting from turning the drive wheels of the vehicle during acceleration. The present invention, furthermore, will operate independently of whether the driving path has a dry surface or is covered with ice.

It will be understood that each of the elements described above, or two or more together, may also find a useful application in other types of constructions differing from the types described above.

While the invention has been illustrated and described as embodied in slip detection arrangement for motor vehicles, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for detecting the slipping or locking of at least one wheel on a surface, comprising, in combination, alternating current voltage generating means mechanically coupled to said wheel for providing an alternating current voltage dependent upon the speed of said wheel; rectifying means connected to the output of said alternating current voltage generating means for rectifying the alternating current voltage of said generating means to provide at its output a pulsating direct current voltage; integrating means having an input connected to the output of said alternating current voltage generating means and to the output of said rectifying means; voltage regulating means having an input connected to the output of said integrating means and an output connected to the input of said rectifying means for maintaining substantially constant the voltage output of said alternating current voltage generating means except for sudden changes in the speed of said wheel associated with slipping or locking of the same; and signal processing means connected to the output of said rectifying means, said signal processing means including a Schmitt trigger connected to receive as input the output of said rectifying means for actuation so as to provide a signal whenever said voltage output of said alternating current voltage generating means suddenly changes by an amount sufficient to indicate slipping or locking of said wheel.

2. The arrangement as defined in claim 1 wherein said voltage generating means includes a rotatable member with projections of ferromagnetic material and mechanically coupled to said wheel; and magnetic circuit means mounted on the axle of said wheel and in the near vicinity of said projections on said rotatable member.

3. The arrangement as defined in claim 1 wherein said signal processing means comprises logical switching components at least partially of semi-conductor construction.

4. The arrangement as defined in claim 1 including a motor vehicle driven by said wheel and braked by a signal provided by said signal processing means.

5. The arrangement as defined in claim 1 including rail-operated vehicle means driven by said wheel, the accelerating forces for said vehicle being regulated by a signal provided by said signal processing means.

6. The arrangement as defined in claim 1 including braking means coupled to said wheel for braking the rotation thereof, the braking force applied to said wheel being dependent upon a signal provided by said signal processing means.

7. The arrangement as defined in claim 1, wherein said alternating current voltage generating means includes a coil having induced therein said alternating current voltage when said wheel rotates, and wherein said voltage regulating means includes a transistor having an input and an output, said input being connected to the output of said integrating means so that the conductivity of said transistor varies in dependence on the output of said integrating means, said output of said transistor being connected to said rectifying means, said coil being connected in series with the emitter-collector path of said transistor so that the direct current flowing through said coil varies in dependence on the conductivity of said transistor, whereby the value of said alternating current voltage is maintained substantially constant for all changes of wheel speed except for sudden changes associated with slipping or locking, which sudden changes cause actuation of said Schmitt trigger.

* * * * *